UNITED STATES PATENT OFFICE.

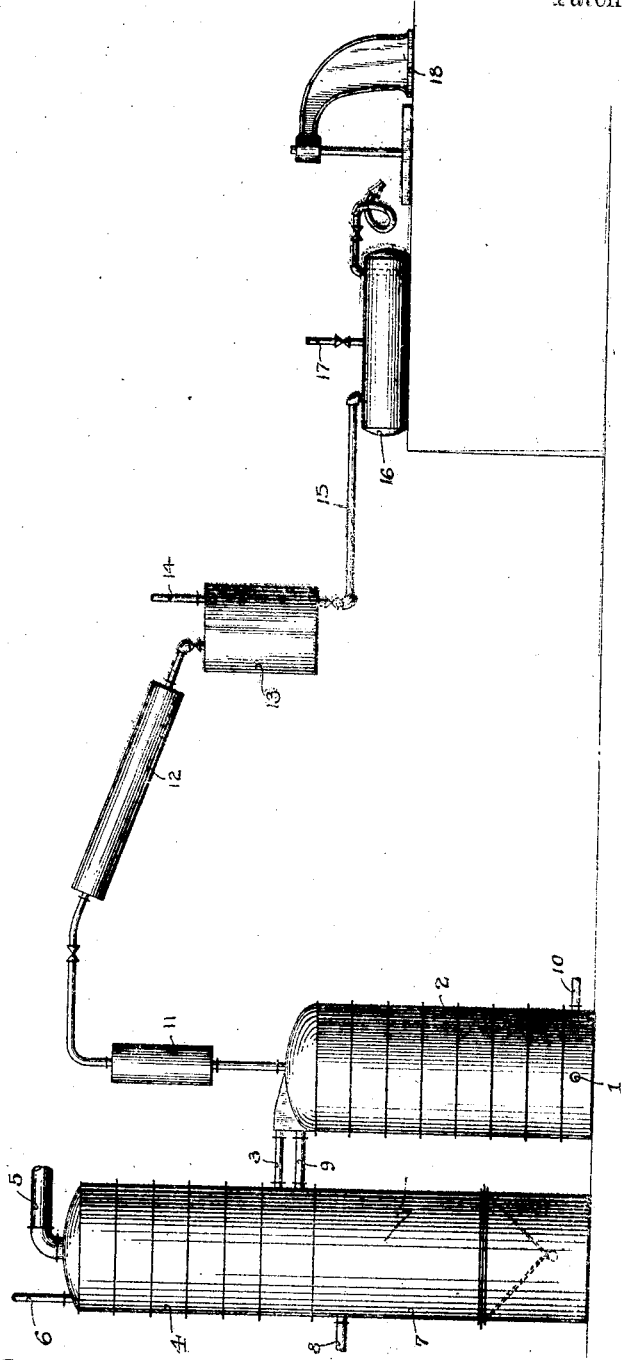

FREDERICK W. SPERR, JR., OF PITTSBURGH, PENNSYLVANIA, ASSIGNOR TO H. KOPPERS COMPANY, OF PITTSBURGH, PENNSYLVANIA, A CORPORATION OF PENNSYLVANIA.

MANUFACTURE OF AMMONIUM SULFAT 1,310,306.  Specification of Letters Patent.  Patented July 15, 1919.

Application filed May 10, 1918. Serial No. 233,675.

*To all whom it may concern:*

Be it known that I, FREDERICK W. SPERR, Jr., a resident of Pittsburgh, Allegheny county, Pennsylvania, have invented a new and useful Improvement in the Manufacture of Ammonium Sulfate, of which the following is a full, clear, and exact description, reference being had to the accompanying drawing, in which the figure is a diagrammatic view of one form of apparatus which may be employed in the practice of my invention.

My invention relates to the manufacture of ammonium sulfate, and is designed to produce ammonium sulfate which is practically free of free acid.

Ammonium sulfate, as commonly prepared by absorbing ammonium vapors in sulfuric acid and subsequent separation of the ammonium sulfate crystals from the acid liquor, contains a certain proportion of free sulfuric acid. The usual practice is to separate the ammonium sulfate crystals from the parent liquor by means of a centrifugal drier; and in order to free the crystals from as much acid as possible, they are washed in the drier with a small quantity of water.

By careful treatment, it is possible to obtain ammonium sulfate in this manner having as low as .15% free acid, but it has not been found practicable by ordinary methods to obtain a material having less than this percentage of acid, and the usual practice produces commercial ammonium sulfate containing from .2 to .4% free acid.

Among the various means that have been proposed for producing a neutral ammonium sulfate free from uncombined sulfuric acid, the most practicable of which I am aware consists in washing the ammonium sulfate crystals immediately after they have been separated from the mother liquor in the centrifuge or other separating apparatus with a crude, weak ammonia liquor, such as the gas liquor which is usually available in large quantities. This practice, however, has several objections, as the crude liquor always contains sulfur compounds which react with small quantities of iron sulfate which the ammonium sulfate usually contains, thereby forming iron sulfid which discolors the crystals. Crude ammonia liquor also usually contains cyanid compounds, and these produce compounds with iron which are colored a deep blue. Furthermore, the crude liquor also frequently contains tar oils, phenols and other impurities which have a bad effect on the quality of the ammonium sulfate.

I have found it possible to overcome these objections and to produce a neutral ammonium sulfate, by washing or treating the ammonium sulfate crystals, after their separation from the mother liquor by an ammonia liquor or vapor which has been largely freed of its impurities and which may be produced from that part of the ordinary ammonia still which is known as the "fixed" still.

In the accompanying diagram, I have shown such a still, together with a general arrangement of other apparatus necessary to the practice of my invention. The operation of such a still and the apparatus is generally as follows:

Steam is admitted to the lower section of the fixed still 2, through the pipe 1, and passes upwardly through the various sections of this still and then through the pipe 3 and the lower section of the free still 4, and thence upwardly through the sections of this free still to the exit pipe 5. The crude, weak liquor is admitted to the upper section of the free still through pipe 6 and flows downwardly through the sections of this still into the tank 7, which forms the base of the still. This tank is usually designated as the "lime leg". In this tank the liquor is mixed with a suitable quantity of milk of lime which is fed in through the pipe 8. The mixture passes through the pipe 9 to the top section of the fixed still, and finally flows out through the exit 10.

The operation of the still is such that all of the volatile ammonia compounds, together with the volatile impurities, are removed by the action of the steam and vapors passing upwardly through the free still. The fixed compounds of the ammonia, such as ammonium chlorid, ammonium sulfate, etc., are decomposed by the action of the lime in the lime leg. The vapors from the fixed still contain ammonia with a very small per cent. of impurities. Sulfur compounds, cyanid compounds, phenols, etc., are removed in the lime leg. Such vapors when condensed make a weak ammonia liquor of a sufficiently high degree of purity to be used for the neutralization of the free acid in the ammonium sulfate, without danger of contaminating the product.

In accordance with my invention, a part of the vapors from the fixed still 2 are caused to pass into the water-cooled reflux condenser 11. In this condenser, the vapors are concentrated, giving a higher percentage of ammonia, and some of the steam condenses and goes back into the fixed still. By varying the amount of water used in the condenser, the strength of the ammonia liquor produced may be regulated within satisfactory limits. The vapors pass through the reflux condenser, and thence through the water-cooled condenser 12 into the mixing chamber 13 having the water supply connection 14. The final strength of the liquor is regulated by the amount of water added to this tank. The mixing tank may be provided with any suitable mechanical or air-stirring apparatus. From the mixing tank, the liquor flows through the feed pipe 15, to the blowing tank 16, which is equipped with steam coils for heating the liquor to the proper temperature. The blowing tank is operated by compressed air which is admitted through the pipe 17, and by means of which the purified ammonia liquor is discharged through a suitable connection on to the crystals in the centrifugal drier 18.

It will be understood that the apparatus which I have diagrammatically shown is illustrative only, and that any suitable apparatus may be employed to utilize the vapors from the fixed still to neutralize free acid in the ammonium sulfate.

I have found it preferable to prepare, for the purpose of this invention, a weak ammonia solution containing from one to three grams of ammonia per liter, and to use such solution at a temperature of from 80 to 90° C. in the blowing tank. The temperature may, however, be raised to a higher degree, and in fact, the solution may be used either hot or cold. I have found that the application of such a solution in the form of a good spray to a five hundred pound batch of ammonium sulfate in the centrifuge for from fifteen to twenty seconds gives a good, white, neutral product containing practically no free acid or ammonia. I have found such washes to require as little as two gallons of ammonia solution for five hundred pounds of ammonium sulfate.

The weak ammonia solution is very stable even when kept heated at 90° C. The various tanks should be made vapor-tight in order to prevent loss of ammonia vapors.

My process is a very easy one to employ because practically every ammonium sulfate plant is equipped with an ammonia still. The main product of the ammonia still may be utilized for other purposes, only a small amount of the vapors from the fixed still being necessary to carry out my process.

Instead of using the ammonia in the form of a weak liquor, good results may be obtained by treating the ammonium sulfate crystals with ammonia in the form of a vapor. This vapor can be taken off just beyond the reflux condenser, and the crystals may be treated with it in any desired manner.

In the appended claims, wherein I refer to the treatment of ammonium sulfate with ammonia, it is to be understood that the term "ammonia" includes both a weak ammonia solution or ammonia vapors of the character described.

I claim:

1. In the manufacture of ammonium sulfate, the method of preparing a neutralizing agent for treating ammonium sulfate crystals, which consists in withdrawing ammonia vapors from the fixed section of an ammonia still for the treatment of such crystals, substantially as described.

2. In the manufacture of ammonium sulfate, the method of preparing a neutralizing agent for treating ammonium sulfate crystals, which consists in taking vapors from the fixed section of an ammonia still, and forming an ammonia liquor therefrom for the treatment of such crystals, substantially as described.

3. In the manufacture of ammonium sulfate, the method of preparing a neutralizing agent for treating ammonium sulfate crystals, which consists in taking vapors from a fixed section of an ammonia still, condensing and concentrating the same, and forming an ammonia liquor therefrom for the treatment of such crystals, substantially as described.

4. In the manufacture of ammonium sulfate, the method of preparing a neutralizing agent for treating ammonium sulfate crystals, which consists in taking vapors from a fixed section of an ammonia still, condensing and concentrating the same, forming an ammonia liquor therefrom, and regulating the strength and temperature of such liquor for the treatment of such crystals, substantially as described.

In testimony whereof, I have hereunto set my hand.

FREDERICK W. SPERR, Jr.